United States Patent [19]
Archibald

[11] 3,884,373
[45] May 20, 1975

[54] APPARATUS AND SYSTEM FOR UNLOADING RAILROAD TANK CAR

[75] Inventor: William R. Archibald, San Anselmo, Calif.

[73] Assignee: Marcona Corporation, San Francisco, Calif.

[22] Filed: Mar. 22, 1974

[21] Appl. No.: 453,769

[52] U.S. Cl. .................. 214/83.28; 302/14; 302/16; 302/52
[51] Int. Cl. ............................................ B65g 53/30
[58] Field of Search ............ 214/83, 28; 302/14, 16, 302/52, 63

[56] References Cited
UNITED STATES PATENTS

| | | | |
|---|---|---|---|
| 2,827,185 | 3/1958 | Feigin | 214/83.28 |
| 3,316,023 | 4/1967 | Koranda | 302/16 |
| 3,338,635 | 8/1967 | Koranda | 302/16 |
| 3,375,942 | 4/1968 | Boram | 214/83.28 |
| 3,451,724 | 6/1969 | Cappelli et al. | 302/14 |
| 3,552,799 | 1/1971 | Koranda | 302/14 |
| 3,606,479 | 9/1971 | Robinson et al. | 302/16 |
| 3,799,620 | 3/1974 | Robinson et al. | 214/44 X |

*Primary Examiner*—Leo Friaglia
*Attorney, Agent, or Firm*—Flehr, Hohbach, Test, Albritton & Herbert

[57] ABSTRACT

Apparatus and system for unloading bulk particulate material from a railroad tank car. A train of tank cars loaded with the material is routed to a discharge station along the rail-road right-of-way. At the discharge station a high pressure water distributor unit is provided with an outlet end adapted to be positioned over an inlet opening on each tank car. A supply conduit is removably mounted for vertical rotation within each tank car with the conduit's upper end positioned within the inlet opening of the tank car. A rotary conduit is carried on the outlet end of the distributor unit and is adapted to be coupled in fluid-tight, rotary connection with the upper end of the supply conduit. The distributor unit carrys a motor to drive the rotary conduit when the latter is coupled with the supply conduit. A nozzle carried by the supply conduit is positioned for directing a high pressure stream of liquid to impinge upon and form a mixture with the material as the supply conduit is being rotated. The mixture which is thus formed flows through a grating in a discharge opening of the tank car and into a collection receptacle provided at the discharge station.

19 Claims, 4 Drawing Figures

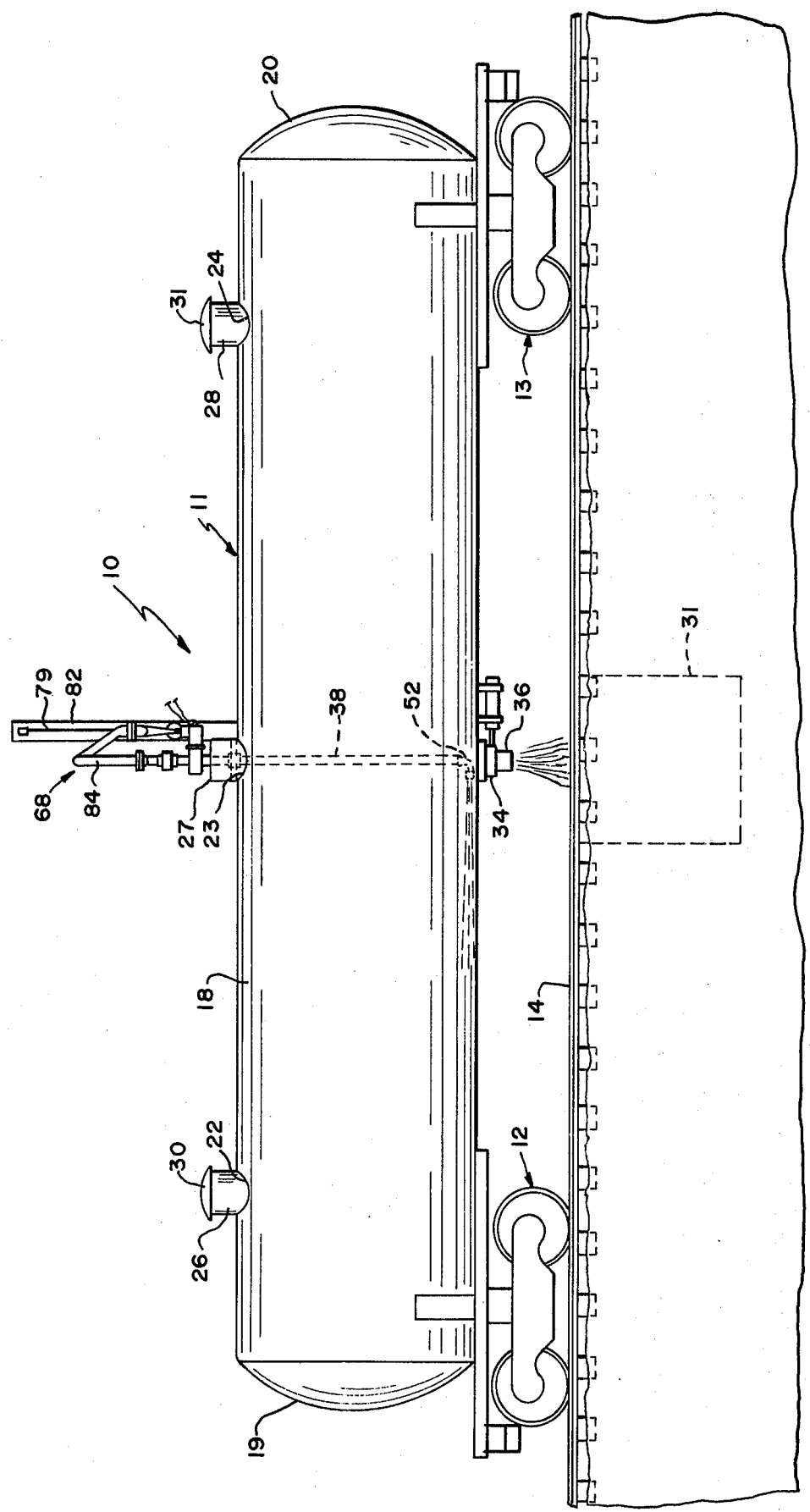

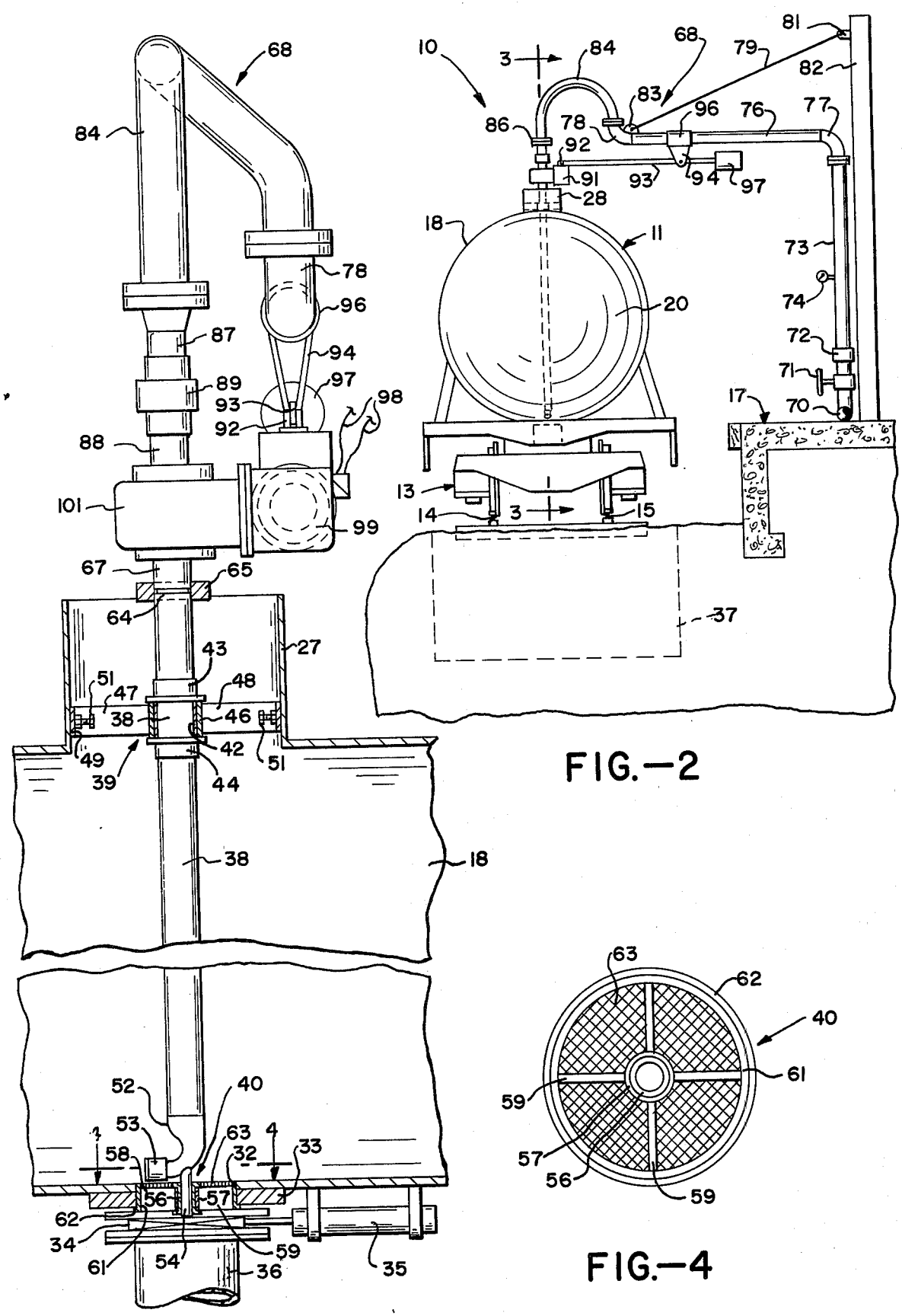

APPARATUS AND SYSTEM FOR UNLOADING RAILROAD TANK CAR

BACKGROUND OF THE INVENTION

It is known to transport and handle bulk particulate material such as mineral ores and the like on railroad cars by means such as dry loading and unloading procedures. In the copending application of Charles W. Robinson Ser. No. 286,102 filed Sept. 5, 1972, now Pat. No. 3,799,620 and assigned to the same assignee there is disclosed a system for transporting bulk material of the type described on railroad cars by procedures in which a slurry is formed with the particulate material. In such a system the material is either dry loaded on the railroad car, or is loaded in slurry form which is then decanted to form a settled mass for transport to destination. At the destination an unloading and slurrying unit is provided which includes a nozzle and slurry receiving sump adapted to move on a carriage into position underneath a discharge opening in the car. A liquid stream jets from the nozzle as the latter is elevated through the discharge opening to form a slurry with the material, and this slurry then flows by gravity into the sump to a collection tank for subsequent handling and processing.

A system of the type described in the co-pending application provides for the efficient and rapid unloading of material from the cars, but at the same time the system requires that relatively expensive equipment be provided at the unloading zone. In addition, a railroad car having a material-containing vessel of specialized design is desirable for use in such a system. In certain cases there is a need for material handling and transport system of the type described employing relatively less expensive and complicated equipment at the unloading destination, and furthermore which may employ railroad tank car of conventional design without major modification.

OBJECTS AND SUMMARY OF THE INVENTION

This invention relates to the transportation and handling of bulk material or flowable solids such as particulate matter or mineral solids (eg., iron ore solids). In particular, the invention relates to a transport and handling system and apparatus of the foregoing nature in which material is loaded within a railroad tank car for transport to destination where the material is slurried and removed at a discharge station.

It is a general object of the present invention to provide a system and apparatus for the transportation and handling of bulk material of the character described which employs means carried within the vessel to form a slurry or mixture of the material with a liquid such as water. The invention has particular application to railroad transportation systems.

Another object is to provide a system and apparatus of the character described in which material slurrying and unloading equipment may be used with railroad tank cars of substantially conventional design capable of being loaded through the upper inlet openings of the cars, and in which relatively inexpensive and simplified equipment is employed at the discharge station for unloading the material.

Another object is to provide a system and apparatus of the character described in which component elements of the apparatus, including a rotatable nozzle, are adapted to be removably mounted within inlet and discharge openings of conventional railroad tank cars, and in which such components may be carried with the railroad car while transporting the load to destination.

Another object is to provide a system and apparatus of the character described in which the discharge station is provided with a distributor unit adapted to both deliver high pressure water to a supply conduit and nozzle fixedly supported through inlet and discharge openings of a railroad tank car while at the same time imparting rotary motion to the supply conduit and nozzle.

The invention includes a tank car or vessel having an upper inlet opening and a lower discharge opening. The vessel is mounted for movement along a railroad for transporting particulate material to a discharge station at the destination. A vertical supply conduit is mounted for rotation within the vessel by bearing means which is releasably mounted within the inlet and discharge openings of the discharge vessel. A nozzle is connected with the supply conduit for directing a stream of liquid into the contained material to form a slurry or mixture which flows by gravity through a grating in the discharge opening for collection in a receptacle at the discharge station. A supply of high pressure liquid is directed into a distributor unit which has a rigid conduit mounted to pivot toward and away from the vessel. A flexible hose carried on the distal end of the rigid conduit has an outlet end connected with a rotary conduit, the lower end of which is adapted to be coupled in fluid-tight rotary driving connection with the upper end of the supply conduit. A motor carried on the distributor unit drives the rotary conduit which in turn rotates the nozzle for directing the liquid stream through a circular path within the vessel.

Additional objects and features of the invention will appear from the following description in which the preferred embodiment of the invention has been set forth in detail in conjunction with the accompanying drawings.

BRIEF DESCRIPTION OF THE DRAWINGS

FIG. 1 is a side elevational view of a railroad tank car within which is mounted material unloading apparatus in accordance with the invention with the car shown in an unloading position at a discharge station along a railroad;

FIG. 2 is an end elevation view of the car, apparatus and station of FIG. 1;

FIG. 3 is an elevational section view to an enlarged scale taken along the line 3—3 of FIG. 1;

FIG. 4 is a sectional view to an enlarged scale taken along the line 4—4 of FIG. 3.

DETAILED DESCRIPTION OF THE PREFERRED EMBODIMENTS

In the drawings there is shown generally at 10 apparatus constructed in accordance with the invention for use in the transportation and handling of bulk particulate material or flowable solids which are characterized in being dispersible with a liquid such as water into a mixture or slurry. Apparatus 10 is specially adapted for transporting the material over a railway network, and may utilize railway tank cars of substantially conventional design. The invention will find application in the transportation of a cargo of mineral solids such as iron ore filtrates and concentrates or other dressed mineral solids from a mining and ore dressing operation to an end use facility, processing station or storage area. The cargo can be directly loaded into the tank cars at the mining operation, transported to destination through a unit train, and unloaded at designation by apparatus and procedures which involve a relatively short unloading time. Additionally, the invention will find application for cleaning out the interior walls of railroad tank cars which have been utilized to carry other cargoes such as potash, molasses, sugar beet syrup or crude oil and the like.

The apparatus 10 incorporates a railroad tank car of the character having a cylindrical tank or vessel 11 supported at opposite ends by wheeled trucks 12, 13 riding on rails 14, 15. Suitable couplers, not shown, are provided at opposite ends of the tank car for coupling a plurality of the cars in a train. The section of track illustrated in the drawings is disposed along a discharge station 17 which is constructed at the unloading destination. While a single discharge station is illustrated, the invention contemplates that a plurality, such as four, stations could be provided in series along the track to permit the simultaneous unloading of four coupled tank cars.

The illustrated vessel 11 is comprised of an elongate, hollow cylindrical shell 18 closed at opposite ends by a pair of dome-shaped end walls 19, 20. A plurality, shown as three, of inlet openings 22, 23 and 24 is formed along the upper portion of the shell 18. An annular coaming 26, 27, 28 extends upwardly form each inlet opening, and a removable cover plate 30, 31 is secured by suitable fastener means across the top of each of the coamings. The particulate material which is to be transported may be dry loaded through each of the inlet openings with the cover plates removed. The material may also be loaded as a slurry or mixture through the inlet openings, and in such case the solids would be permitted to settle and the supernatant liquid fractions removed by decanting operations to leave a settled mass of solids within the vessel.

A discharge opening 32 is formed in the lower portion of the vessel in vertical register with the central inlet opening 23. An annular plate 33 is mounted about the discharge opening on the outer surface of shell 18, and a suitable discharge valve 34 is mounted below this plate to open and close the discharge opening. The discharge valve 34 is illustrated schematically, and such valve may comprise a knife gate valve coupled with a suitable linear air actuator 35 adapted to slide the gate valve back and forth across the discharge opening. A short length discharge tube 36 is mounted in depending relationship below valve 34 to direct the discharge flow downwardly.

At the discharge station 17 means are provided for collecting the discharge flowing from the tank car. The collection means preferably comprises a receptacle 37, such as a fixed or retractable collection launder, mounted below the track. The receptacle opens upwardly to receive the discharge flow which falls by gravity through the cross ties from the discharge opening of an overlying tank car. From the collection receptacle the flow may be directed to a suitable sump, not shown, where it may be pumped to a storage zone, processing station or into the hold of a ship, for example.

Within vessel 11 of the tank car a supply conduit 38 is mounted for rotation about a vertical axis by means of upper and lower bearing assemblies 39, 40 mounted within respective inlet and discharge openings 23, 3.

The bearing assemblies are adapted for rapid mounting within and dismounting from the tank car. The upper bearing assembly 39 comprises a bushing 42 of a suitable low-friction material rotatably mounted about the upper end of supply conduit 38 and positioned between the flanges of a pair of spaced-apart bearing collars 43, 44 fixedly secured to the supply conduit. A cylindrical bearing support 46 is mounted about bushing 42 and is centrally positioned within coaming 27 by means of a plurality of flat, upstanding support arms 47, 48 which extend radially inwardly from a support ring 49 of a size commensurate with the inner diameter of the coaming. The support ring 49 is releasably secured to the coaming by suitable fasteners such as the plurality of set-screws 51 circumferencially spaced about the ring.

A liquid jet nozzle 52 is mounted at the lower end of supply conduit 38. Preferably nozzle 52 is of a construction and operation as disclosed in U.S. Pat. No. 2,749,314, issued to Robinson et. al., dated July 31, 1973. Such a nozzle is specially characterized in being capable of converting a high pressure source of liquid into a high velocity liquid jet stream with high efficiency so that the jet stream is capable of impacting upon compacted solids with high forces to break up and disperse the solids into slurry form. The discharge outlet 53 of nozzle 52 is positioned to direct the liquid stream laterally of supply conduit 38 so that as the latter is rotated in a manner hereafter described the stream sweeps through a circular path within the vessel.

The lower bearing assembly 40 is mounted about a pivot pin 54 which is secured to nozzle 52 and which extends downwardly along the axis of supply conduit 38. A bushing 56 of a suitable low-friction material is rotatably mounted on the end of pivot pin 54, and the bushing is supported by an annular bearing support 57 positioned centrally of the discharge opening. The bearing support in turn is supported by a plurality of flat, upstanding support arms 58, 59 extending radially inward from a support ring 61 which has a diameter commensurate with the inner diameter of the discharge opening and annular plate 33. A circular rim 62 is formed about the lower end of support ring 61 for locking engagement against plate 33 when discharge valve 34 is mounted in position by suitable means, such as a circle of bolts. With the discharge valve removed the lower bearing assembly 40 may be dropped downwardly from the discharge opening and from pivot pin 54 to permit the supply conduit to be withdrawn from the vessel. A grating 63, preferably comprising a relatively large-mesh screen, is mounted across the upper end of support ring 61 about bushing 56. The grating functions to preclude the flow of solid material above a given particle size through the discharge opening for preventing possible plugging and malfunction of the slurry transport system, such as the pumping apparatus.

The upper end 64 of supply conduit 38 terminates at substantially the elevation of the upper rim of coaming 27, and the conduit is formed at this end with grooving, not shown, which cooperates with a suitable coupling 65, preferably of the type adapted to be quickly coupled and uncoupled, to form a fluid-tight seal with a rotary conduit 67. The rotary conduit is inserted from above the tank car and is a part of a water distributor unit 68 located at the discharge station. The upper end of the supply conduit is also provided with releasable drive transfer means, such as a key and keyway structure, not shown, for transferring a torque force from rotary conduit 67 to rotate the nozzle in a manner to be described.

A liquid such as water under pressure is supplied at discharge station 17 from a suitable water pump, not shown, feeding into manifold pipe 70. A manually operated control valve 71 controls the water supply from the manifold into distributor unit 68 through a suitable swivel joint 72 and into a riser pipe 73. The swivel joint is adapted to provide a fluid-tight connection while permitting the riser pipe to swivel about a vertical axis. A pressure gage 74 is connected into pipe 73 to permit visual monitoring of the water supply pressure. A rigid horizontal conduit 76 is connected to the riser pipe through elbow 77 and is provided at its distal end with an upwardly turned elbow 78. The horizontal conduit is supported for pivotal movement about a vertical axis by a wire stay 79 mounted between a pivot connection 81 secured to a fixed support 82 and a bracket 83 secured to elbow 78. A length of flexible high pressure hose 84 is connected at one end to the elbow 78 and is turned in a gooseneck configuration with its outlet end 86 facing downwardly.

As best shown in FIG. 3 a flanged adapter fitting 87 is connected at one end to the outlet end of hose 84 and at its other end to the upper end 88 of rotary conduit 67 by a suitable swivel joint 89 of the type adapted to provide a fluid-tight connection while permitting relative rotation between the conduit and fitting. The lower end of rotary conduit 67 is provided with a suitable drive transfer structure, such as a key and keyway, not shown, which is adapted to interfit with the previously described drive structure formed at the upper end of the supply conduit. The lower end of rotary conduit 67 is also formed with grooving which cooperates with coupling 65 to form the previously described fluid-tight seal at the connection with the supply conduit.

Actuating means comprising a drive motor 91 for rotating the conduits and nozzle is carried on the distributor unit through a pivot connection 92 on the outer end of an operating arm 93. The operating arm in turn is pivotally connected to a bracket 94 depending from a collar 96 mounted about the distal end of ditributor conduit 76. The inner end of arm 93 is provided with a suitable weight 97 for counterbalancing the weight of the motor, rotary conduit 67, hose 84 and other components carried therewith. The collar 96 is adapted for axial sliding movement along distributor conduit 76, and suitable locking means, not shown, may be provided to lock the collar in a selected position on the conduit to permit a range of radial adjustment for moving the lower end of rotary conduit 67 into proper position before it is coupled with supply conduit 38. The foregoing arrangement accomodates for variations in the positioning of the cars at the discharge station, and for variations in the size and configurations of the cars.

Drive motor 91 preferably comprises an electric motor powered from electrical supply cables 98 extending along distributor unit 68 from the adjacent station. The motor drives reduction gearing carried within housing 99, and this gearing in turn drives conduit 67 through suitable means such as a worm gear engaging a worm wheel secured about the conduit and carried within housing 101.

The use and operation of the apparatus disclosed herein will now be described in relation to the transportation of a mineral ore comprising, for example, dressed iron ore concentrate. A plurality of railroad tank cars of the type described herein are fitted with the nozzle structure of the invention by first removing the cover plate from the central inlet opening and by dismounting valve 34 from the discharge opening. Lower bearing support 40 is then inserted within the discharge opening with outer ring flange 62 engaging the inner edge of plate 33. Discharge valve 34 is then remounted onto plate 33 to capture the lower bearing assembly in place. The supply conduit 38 carrying upper bearing assembly 39 is then lowered through coaming 27 and guided downwardly so that pivot pin 54 drops into bushing 56 of the lower bearing assembly. The set screws 51 are then advanced outwardly to secure outer ring support 48 in position with the coaming. The vessel is then loaded with the material through the inlet openings by suitable dry loading procedures, or alternatively in the form of a slurry followed by successive decanting operations to form a settled mass of solids within the vessel. The three cover plates are then replaced, and the tank car is transported to destination.

At the destination the train of cars is shunted onto a spur track along which are located one or more of the discharge stations 17. For example, where four such stations are constructed in series along the track, the first group of four loaded tank cars in the train are moved by a switching locomotive into position along the stations with the discharge openings of each car aligned over a respective collection receptacle 37. The central cover plate is then removed and distributor unit 68 is pivoted outwardly over the car. As required, collar 96 is moved along the length of distributor conduit 76 so that rotary conduit 67 is centrally positioned over coaming 27. Operating arm 93 is then pivoted to move the lower end of rotary conduit 67 into abutting relationship with upper end 64 of the supply conduit. The fluid-tight coupling 65 is then completed at the juncture of the two conduits. Discharge valve 34 is then opened by energizing actuator 35, flow control valve 71 is opened, and electric motor 91 is energized. With manifold 70 supplying water under a pressure head in the range of 250-350 psi, water is directed through the conduits and flexible hose of distributor unit 68 and into rotary conduit 67 and supply conduit 38 from which it jets laterally through nozzle 52.

The velocity water stream pulps the material into a slurry by causing the compacted solids to disperse, break up and become suspended in the water. This slurry flows by gravity through grating 63 in the discharge outlet and falls into collection receptacle 37 from which it flows to a sump for subsequent pumping and handling. During the slurrying operation motor 91 drives rotary conduit 67 to rotate supply conduit 38 and the nozzle which is capable of turning about a vertical axis within the mass of material. This causes the water stream to move through a circular path within the vessel. The water stream impacts upon a portion of compacted solids and causes it to disperse and break up, and to become suspended in the water as a slurry. As the nozzle rotates, preferably within the speed range of from ¼ r.p.m. to 6 r.p.m., the stream moves away from the region of impact to an adjacent region. The freshly formed slurry left behind is simultaneously removed as it flows through the discharge opening to avoid the formation of any standing water. The cutting action of the water stream is thus undiminished in impacting the compacted solids. Continued movement of the stream undercuts and removes material over an area which continues to increase until the overlying material collapses and is successively removed. The pulping and slurring action is continued until the complete load of material is discharged. After the cargo is completely unloaded valve 71 is closed, motor 91 is deenergized and discharge valve 34 is closed. Coupling 65 is then released and rotary conduit 67 pivoted upwardly from the inlet opening. Distributor unit 68 is then swung away from the tank car. With all four cars in the group unloaded in the manner described, the next group of four cars are moved along the rails into position along the unloading stations and the foregoing operations are repeated until the complete train is unloaded.

While the foregoing embodiments are at present considered to be preferred it will be understood that numerous variations and modifications may be made therein by those skilled in the art and it is intended to cover in the appended claims all such variations and modifications as fall within the true spirit and scope of the invention.

I claim:

1. Apparatus for unloading flowable solids material from a railroad car, the material characterized in being dispersible with a liquid to form a slurry, comprising the combination of a vessel mounted on the car, the vessel having a hollow interior together with an inlet opening and a discharge opening nozzle means carried within the vessel, supply conduit means carried within the vessel for supplying liquid to the nozzle means, said conduit means having an inlet end adapted to be connected with a source of liquid under pressure, actuating means for moving the nozzle means to direct the stream of liquid jetting therefrom through a path within the vessel to disperse and suspend the solids impacted by said stream to form a slurry, said inlet opening disposed on a top portion of the vessel and said discharge opening disposed on a lower portion of the vessel in vertical register with the inlet opening, said supply conduit extending within said vessel between said inlet and discharge openings and detachably supported in said inlet and outlet openings so as to be removably mounted from said vessel, and valve means for closing said discharge opening whereby the load of material can be transported within the vessel and for opening said discharge opening whereby said slurry can be discharged therethrough.

2. Apparatus as in claim 1 in which said nozzle means comprises a nozzle mounted on the lower portion of said supply conduit, said nozzle being provided with a nozzle outlet positioned to direct said liquid stream in a direction laterally of the supply conduit.

3. Apparatus as in claim 1 in which said nozzle means is mounted on said supply conduit, said nozzle means including a nozzle outlet positioned to direct said liquid stream in a direction laterally of the supply conduit, and siad actuating means includes means for turning said nozzle means about a vertical axis for directing said stream through a leteral path within the vessel.

4. Apparatus as in claim 3 which includes bearing means mounted in said inlet and discharge openings for supporting said supply conduit for rotation about said vertical axis, and the actuating means includes means to turn said supply conduit about said vertical axis.

5. Apparatus as in claim 3 which includes grating means mounted with the bearing means in the discharge opening for precluding flow of solids sized above a given particle size through said discharge opening.

6. In a system for unloading a particulate material from a vessel, the material characterized in being dispersible with a liquid to form a slurry, the combination of a vessel having a hollow interior adapted to contain a load of the material, the vessel having an inlet opening for receiving the material and a discharge opening for discharging the slurry, means for supporting said vessel for movement in a train over a railroad to a discharge station, nozzle means carried in the vessel for directing a stream of liquid into the material to disperse and suspend the material impacted by said stream to form a slurry, supply conduit means for directing liquid to the nozzle means, the supply conduit means having an inlet end adjacent the inlet opening, a source of liquid under pressure at said discharge station, distributor conduit means having an outlet end for directing liquid from said source to the inlet end of said supply conduit means when the vessel is located at said discharge station, and collection means for receiving the slurry which flows through the discharge opening of the vessel at the discharge station.

7. A system as in claim 6 which includes means for releasably coupling the outlet end of the distributor conduit means in fluid communication with the inlet end of the supply conduit means, together with means for selectively positioning said outlet end in vertical register over the supply conduit means inlet end when the vessel is positioned at the discharge station.

8. A system as in claim 7 in which a portion of said distributor conduit means includes a rigid conduit mounted for pivotal movement at said station toward and away from said vessel, and in which another portion of the distributor conduit means includes a flexible conduit connected at one end with said rigid conduit and at its other end with said coupling means.

9. A system as in claim 7 in which said nozzle means is mounted for movement with said supply conduit means, said supply conduit means is mounted for rotary movement about its longitudinal axis withing said vessel, together with actuating means carried by said distributor conduit means for rotating said supply conduit means about said axis when said inlet end is coupled with said distributor conduit means.

10. A system as in claim 9 in which the distributor conduit means includes a rigid portion mounted at said station for movement toward and away from said vessel and a flexible portion connected for fluid communication between said rigid portion and said releasable coupling means, and operating means carried by said rigid portion for moving the outlet end of the distributor conduit means toward and away from the inlet end of the supply conduit means.

11. A system as in claim 10 in which the actuating means includes a motor mounted for movement with the outlet end of the distributor conduit means, and means coupled with said motor for rotatably driving said supply conduit means.

12. A system as in claim 6 in which said collection means includes a receptacle mounted at said station with an opening located along said right-of-way for receiving the slurry from the discharge opening of a vessel which is positioned over the receptacle.

13. Apparatus for unloading flowable solids from a vessel mounted on a railroad car, the vessel having a hollow interior, an upper portion of the vessel being provided with an inlet opening and a lower portion of the vessel being provided with a discharge opening in substantially vertical register with the inlet opening, the combination of a supply conduit oriented vertically along an axis extending between said inlet and discharge openings, first bearing means mounted within said inlet opening for supporting the upper end of said supply conduit for rotation about said axis, second bearing means mounted within said discharge opening for supporting the lower end of said supply conduit for rotation about said axis, and nozzle means carried by said supply conduit within said vessel for directing a stream of liquid within the vessel in a direction extending laterally of said axis to disperse and suspend the solids impacted by said stream to form a slurry which flows through the discharge opening.

14. Apparatus as in claim 13 including means for releasably securing said first and second bearing means with said respective inlet and discharge openings.

15. Apparatus as in claim 13 in which said discharge opening of the vessel is circular, and including an annular insert member mounted concentrically within said discharge opening, together with means for mounting said second bearing means on said insert member.

16. Apparatus as in claim 15 in which said second bearing means is mounted concentric with said insert member, together with grating means mounted between the inner periphery of said insert member and said second bearing means for precluding flow of solids sized above a given particle size through said discharge opening.

17. Apparatus as in claim 13 in which said supply conduit includes a length of hollow pipe having its upper end positioned within said inlet opening of the vessel, together with means on the upper end of said pipe for releasably establishing a fluid-tight, rotatable driving connection with the outlet end of a distributor conduit which is adapted to be positioned over the vessel at a discharge station and in which the distributor conduit is further adapted to be connected with a source of liquid under pressure.

18. A system for unloading solids material from a railroad car, the material characterized in being dispersible with a liquid to form a slurry, comprising the combination of a vessel mounted on the car, the vessel having a hollow interior with an upper inlet opening and a lower discharge opening, valve means for opening and closing the discharge opening, a supply conduit positioned in the vessel and extending between the inlet and discharge openings, first bearing means releasably mounted witin the inlet opening for rotatably supporting the upper end of the supply conduit means, second bearing means releasably mounted within the discharge opening for rotatably supporting the lower end of the supply conduit means, nozzle means carried by the lower end of the supply conduit and in fluid communication therewith, the nozzle means having a discharge outlet which directs a stream of the liquid through a path within the vessel to disperse and suspend the solids impacted by said stream to form a slurry, a discharge station along said right-of-way having a source of liquid under pressure, a rigid distributor conduit pivotally mounted at said station for movement toward and away from one of said vessels which is positioned thereat, means for selectively connecting said rigid conduit with the source of liquid, a flexible conduit having one end connected with said rigid conduit and having an outlet end, rotary conduit means having an upper end coupled in fluid-tight rotary connection with the outlet end of the flexible conduit and having a lower end, means for coupling the lower end of the rotary conduit in fluid-tight, rotary driving engagement with the upper end of the supply conduit, drive means carried by the rigid conduit for rotating the rotary conduit when the latter is in coupling engagement with the supply conduit, and collection means along the right-of-way at said station for receiving the slurry which flows through the discharge opening of the vessel.

19. Apparatus for unloading flowable solids from railroad cars, comprising: a railroad tank car having a hollow interior for containing the flowable solids and a plurality of wheels thereon for transporting the tank car on tracks, said tank car having an inlet opening disposed on the top portion of the car and a discharge opening disposed on the bottom portion of the car in vertical register with the inlet opening; a supply conduit rotatably mounted and supported in both the inlet opening and the outlet opening of the car, said supply conduit being connectable to a source of high pressure liquid; upper bearing means rotatably mounting and supporting said supply conduit in the inlet opening of the car; lower bearing means rotatably mounting and supporting said supply conduit in the outlet opening of the car; a horizontally directed, rotatable nozzle attached to said supply conduit and in fluid communication therewith so that the nozzle directs a high velocity stream of liquid provided by the high pressure source and the supply conduit into the flowable solids in the car, said nozzle being located in the bottom portion of the car proximate to the discharge opening so that the high velocity stream of liquid is directed along the bottom of the interior of the car; and means for rotating said nozzle and said supply conduit in the interior of the car so that the high velocity stream of liquid sweeps out a circular path.

* * * * *